Aug. 5, 1958     G. E. BJÖRKLUND ET AL     2,845,709

DENTAL DRILLS

Filed Oct. 12, 1954

United States Patent Office 2,845,709
Patented Aug. 5, 1958

2,845,709

DENTAL DRILLS

Gustaf Erik Björklund, Stockholm, and Svante Roland Edvardsson, Solna, Sweden, assignors to Aktiebolaget Dentatus, Hagersten, Sweden, a corporation of Sweden Application October 12, 1954, Serial No. 461,886

Claims priority, application Sweden October 24, 1953

5 Claims. (Cl. 32—59)

The present invention has reference to dental drills of the kind having cutting edges forming an angle with each other and meeting each other in more or less pointed corners. These corners are exposed to very high strain, and therefore they are worn out rapidly and are also apt to be damaged whereby the drill will be unfit for use.

In order to increase the resistance of the drill, it has been proposed to grind off the edge formed where the back surfaces of the cutting edges meet, so as to avoid too sharp points at the corners of the cutting edges. However, by means of this grinding operation the cross section profile of the cutting edges will be principally unchanged at the corners, and therefore, in order to attain appreciable improvement of the drill, the grinding must be made to such an extent that the profile of the drill is changed beyond permissible limits.

The object of the present invention is to give such a shape to the corners of a drill of the type mentioned above that such corners will be even stronger than the other portions of the cutting edges. This is achieved by the corners being ground off in such a way that a grinding surface is obtained at each corner which forms part of a conical surface, the apex of which is located on the centre line of the drill.

The invention will be further described in the following description of a suitable form of drill according to the invention, reference being had to the accompanying drawing in which.

Figure 1:
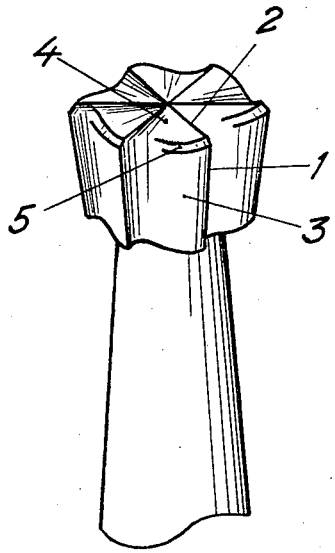
Fig. 1 shows a perspective sketch of a known drill.

The known drill shown in Fig. 1 is of the kind having cutting edges 1 on the sides and, coherent with these, cutting edges 2 on the end surface. The corner formed where the edges 1 and 2 meet has been blunted by grinding off the edge where the back surfaces 3 and 4 meet. The grinding has in the main the same width on the whole edge so that a grinding surface 5 of uniform breadth is obtained.

Figure 2:
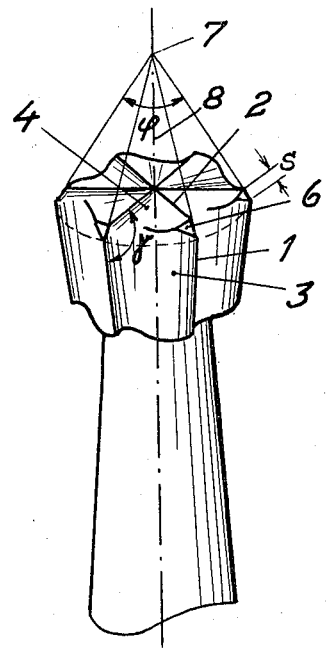
Fig. 2 shows a corresponding sketch of the drill according to the present invention.

In comparison therewith, the drill according to the invention shown in Fig. 2 has the corresponding corners ground off in such a way that a grinding surface 6 is formed at each corner which is substantially triangular in shape and forms part of a conical surface, the apex 7 of which is located on the centre line 8 of the drill. The peak angle $\varphi$ of the conical surface may vary within wide limits and is chosen with regard to the profile of the drill. The greatest strength of the cutting edges of the drill is obtained when the peak angle $\varphi$ is equal to the angle $\gamma$ between the cutting edges, but from a practical point of view the drill is quite equal in strength at values of $\varphi$ within a wide range about the said most favourable value.

Figure 3:
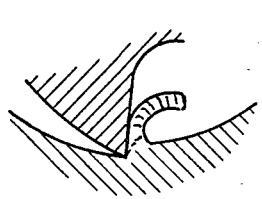
Fig. 3 shows a cross section of the cutting edge at one corner of the drill shown in Fig. 1.
Figure 4:
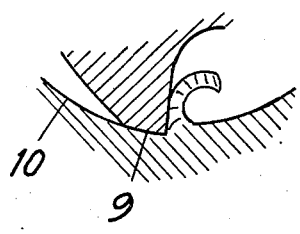
Fig. 4 shows the corresponding cross section of the drill according to Fig. 2.

The favourable effect of the grinding according to Fig. 2 as compared with the known method of grinding according to Fig. 1 is best seen from Figs. 3 and 4. With the cross section of the cutting edges obtained by the grinding method according to Fig. 1 the cutting edge will have a tendency of penetrating too deeply into the material worked upon, if the drill is set up with somewhat too high drill pressure. The cutting depth will then be so large that the cutting edges are subjected to such stresses that they may burst.

With the grinding according to the invention a cross section of the cutting edge as shown in Fig. 4 is obtained. Through the conical grinding a supporting surface 9 on the cutting edge is obtained which has the same radius of curvature as the surface 10 generated by the cutting edge in the material. The conical surace of the cutting edge takes up the main drill pressure, so that the cutting edge is prevented from penetrating too deeply into the material, should the drill be set up with too high drill pressure. If the drill is put on to the material in such a manner that the centre line forms the angle of $\varphi/2$ with the surface of the material, the contact between the cutting edge and the surface to be worked upon will in the first moment take place along a line and at other inclinations of the drill in a point. At the very least penetration of the drill into the material, the contact will, however, take place on a surface. This surface creates great resistance against the penetration of the cutting edge into the material to a larger depth than the cutting depth determined by the first contact of the cutting edge with the material.

With the grinding according to Fig. 3, on the other hand, the contact between the cutting edge and the material takes place along a line during the whole cutting operation. Therefore, the drill pressure necessary for a deeper penetration of the cutting edge into the material is in this case very small and may even decrease on increasing penetrating depth. Consequently, there will be great danger of the drill jamming itself in the material.

The size of the bevel of the cutting edge carried out according to the invention is of great importance. The larger the bevel is, the greater the resistance to penetration will be. The bevel must, however, be limited with regard to the change of the drill profile and to the desire of holding the drill pressure at a low value. It has become evident that the drill will be sufficiently strong and resistant, if the ground surface has a maximal extent S along the generant of the conical surface that is larger than one tenth of the drill diameter. At values of S up to 15 percent of the drill diameter the necessary drill pressure will not increase noticeably.

What we claim is:

1. A dental drill comprising a head having an end surface extending laterally from the axis of rotation of the drill and a side surface extending generally longitudinally of said axis at the radially outer part of said end surface, each of said surfaces having a leading cutting edge, said edges being angularly related and so located that the projections thereof substantially intersect, and a grinding surface formed on said head between and angularly related to said end and said side surfaces at the leading portions thereof and intersecting said cutting edges, said grinding surface constituting a portion of a cone the apex of which is located substantially at the axis of rotation of the drill.

2. A drill as defined in claim 1 in which the peak angle included at the axis of the drill between the projections of two diametrically opposite grinding surfaces is of substantially the same order as the angle between the cutting edges of said end and said side surfaces.

3. A drill as defined in claim 1 in which said grinding surface is so related to said end and said side surfaces as to be substantially triangular and provided with a leading cutting edge angularly related to the axis of rotation of the drill and connecting the leading cutting edges of said end surface and said side surface.

4. A drill as defined in claim 1 in which the length of the grinding surface along the line of the generatrix of the cone exceeds 10% of the diameter of the drill.

5. A drill as defined in claim 4 in which said length does not exceed 15% of the diameter of the drill.

References Cited in the file of this patent

UNITED STATES PATENTS

| | | |
|---|---|---|
| 2,126,476 | Koonz | Aug. 9, 1938 |
| 2,280,927 | Phillips | Apr. 28, 1942 |